April 5, 1960     O. LUTHI     2,931,308
PLURAL INTERMESHING SCREW STRUCTURES
Filed March 29, 1957     2 Sheets-Sheet 2
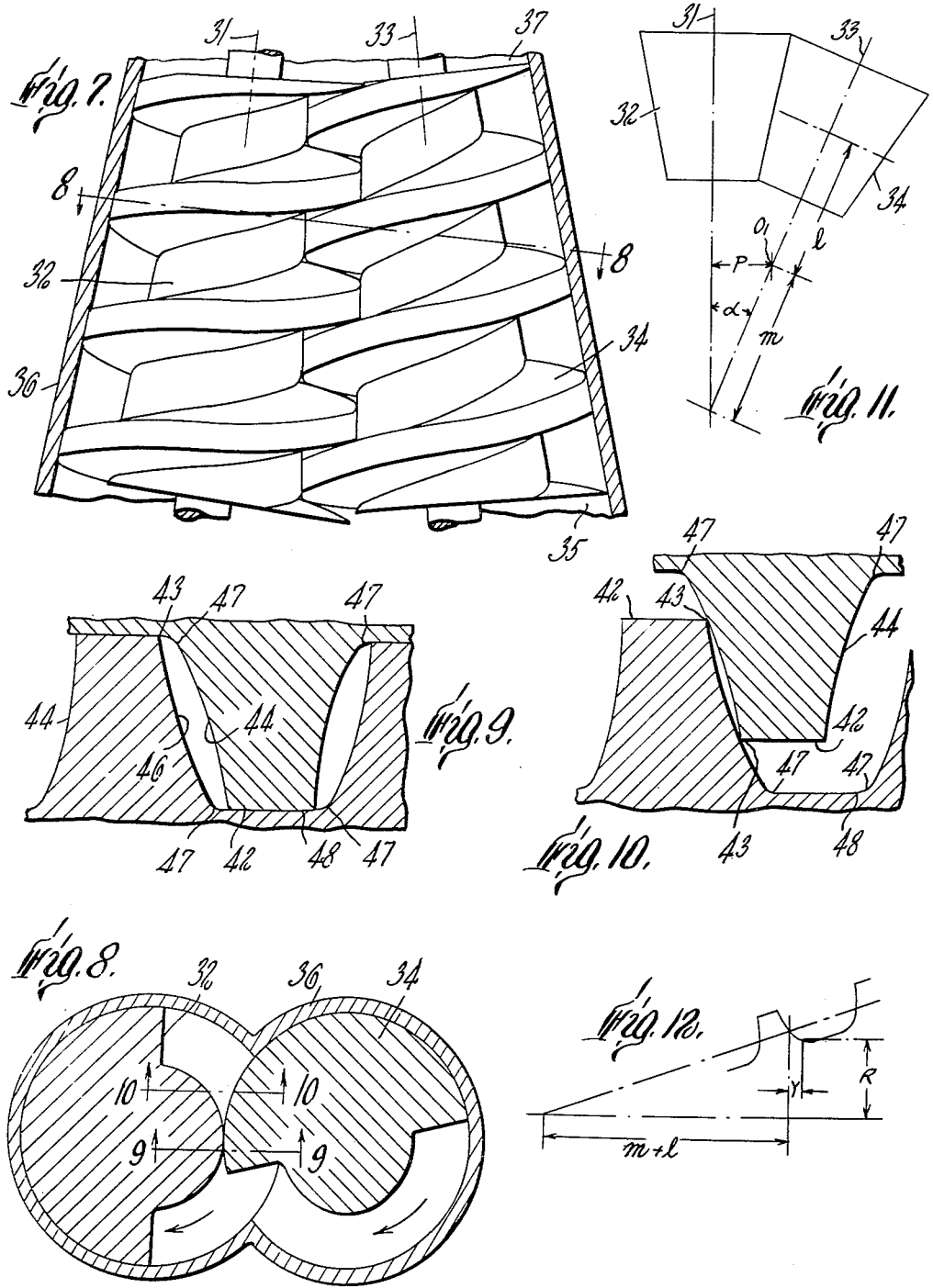

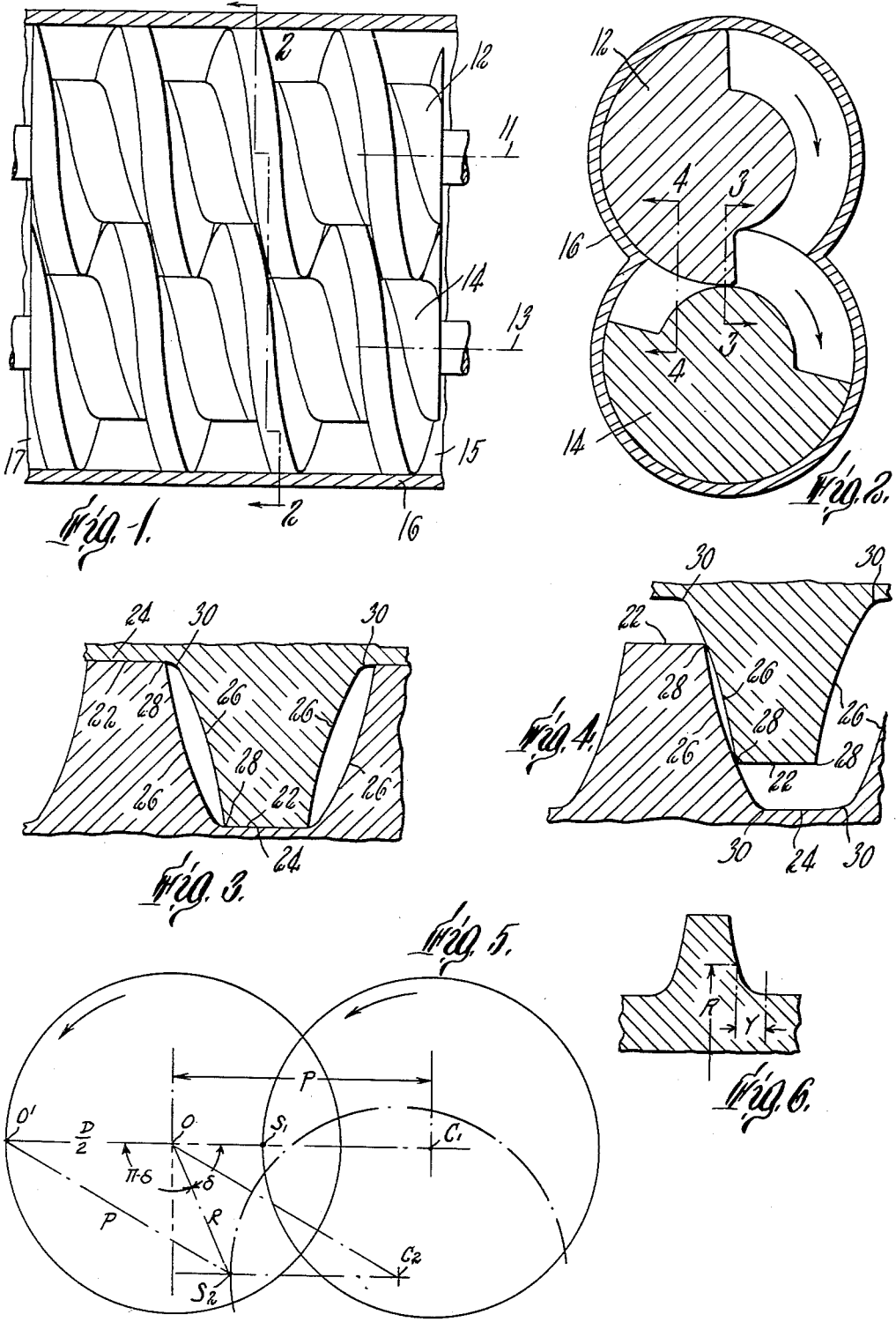

United States Patent Office 2,931,308
Patented Apr. 5, 1960

2,931,308

PLURAL INTERMESHING SCREW STRUCTURES

Oscar Luthi, Nashua, N.H., assignor to Improved Machinery Inc., Nashua, N.H., a corporation of Maine Application March 29, 1957, Serial No. 649,471

1 Claim. (Cl. 103—128)

This invention relates to plural intermeshing screw structures particularly useful as pumps, screw presses and the like.

Intermeshing screws mounted within a suitable housing and turning in the same direction about parallel axes heretofore have been used with some success as conveyors for viscous liquids, pulverized solids, liquid solid mixtures, and the like because the intermeshing of the threads effectively prevents rotation of the material being conveyed, while the motion of meshing threads in opposite directions overcomes the jamming tendencies which occur when the screws move in the same direction.

Accordingly, it is an object of the present invention to provide a plural intermeshing screw structure, especially useful as a pump, screw press and the like, wherein a plurality of screws having a novel specifically defined thread form rotate within a housing in the same direction about their coplanar axes, either parallel or intersecting, to prevent jamming or clogging.

For the purpose of explaining preferred embodiments of the invention, reference is made to the following specification and appended drawings wherein:

Fig. 1 is a plan view of a pair of intermeshing screws mounted within a housing for rotation about parallel axes according to the present invention;

Fig. 2 is a cross-sectional end view of the screws of Fig. 1;

Fig. 3 is an enlarged cross-sectional view of the novel thread form of the invention taken on the full meshing line 3—3 of Fig. 2;

Fig. 4 is a view similar to that of Fig. 2 but taken on the partial meshing line 4—4 of Fig. 3;

Fig. 5 is a simplified end view of the screws of Fig. 1 illustrating a basis for the derivation of the novel thread form of parallel axes screws of Figs. 1 through 4;

Fig. 6 is a partial side view associated with that of Fig. 5;

Fig. 7 is a plan view of a pair of intermeshing screws mounted within a housing for rotation about coplanar intersecting axes according to the present invention;

Fig. 8 is a cross-sectional end view of the screws of Fig. 7;

Fig. 9 is an enlarged cross-sectional view of the screws of Fig. 8 taken on the full meshing line 9—9 thereof;

Fig. 10 is an enlarged cross-sectional view of the screws of Fig. 8 taken on the partial meshing line 10—10 thereof;

Fig. 11 is a simplified plan view illustrating a basis common to all coplanar screw structures for derivation of tooth form; and Fig. 12 is a partial side view associated with that of Fig. 11.

Referring to Figs. 1 through 6, the pair of intermeshing screws with novel thread form according to the present invention, generally designated 12 and 14, are identical, each having threads of novel form and with lead of the same hand extending for at least one full turn and preferably for a number of turns, said screws being mounted for rotation about parallel, coplanar axes within a housing having an inlet opening 15 and outlet opening 17 with a body portion 16 therebetween and being driven for rotation in the same direction at the same speed by any suitable means (not shown). It will be appreciated that the speed of rotation of each screw will be determined by the relative diameters and leads of the screws, and these need not be the same for each screw of a pair or group.

The novel thread form of the present invention as best seen in Figs. 3 and 4 may best be described as of trapezoidal cross section with generally flat crests 22 and bottoms 24 of equal width and of cylindrical surface relative to their axes 11 and 13 and with thread sides 26 in the shape of a concave curve extending continuously from the sharp crest corner 28 to the rounded root corner 30. The curve of the cooperating sides 26 is defined by the movement of a sharp crest corner 28 of a thread of one screw relative to the other screw so that fluid sealing is provided between each said crest and the cooperating side on one side of said threads (Fig. 4) with the portion of sides 26 between such crests extending concavely relative to one another.

More specifically, referring to Figs. 5 and 6, consider in the case of screws of equal diameter that the path of a point S on the circumference of one screw having a lead L considered relative to the other screw as it moves from $S_1$ to $S_2$ is actually a circle with center at O' which center is on the circumference of the screw with center at O. The triangle O, O', $S_2$ which has as sides D/2, R, and P can then be expressed as the law of cosines.

Thus, since $$P^2 = \frac{D^2}{4} + R^2 - 2\left(\frac{D}{2}\right)R \cos(\pi - \delta)$$

and $$Y = -\frac{L}{2\pi}\delta \text{ or } \delta = -\frac{2\pi Y}{L}$$

where
L=lead
P=distance between axes
D=outside screw diameter
R=distance of point S from center O
δ=angle traveled by point S about center O Solving for δ:

$$\delta = \text{arc cos } \frac{P^2 - \frac{D^2}{4} - R^2}{DR}$$

and substituting $$\frac{2\pi Y}{L} = \text{arc cos } \frac{P^2 - \frac{D^2}{4} - R^2}{DR}$$

gives $$Y = \frac{L}{2\pi} \text{ arc cos } \frac{P^2 - \frac{D^2}{4} - R^2}{DR}$$

where Y is the expression of the movement of the point S on one screw relative to the other screw in a direction parallel to said other screw axis as shown in Fig. 6.

Similarly, as shown in Figs. 7 through 10, an intermeshing screw structure may be provided wherein conical intermeshing screws, generally designated 32 and 34, are mounted within a housing central portion 36 with a suitable inlet 35 and outlet 37 for rotation about intersecting coplanar axes. The thread form is generally similar to that of the parallel axis structure above described except that the generally flat thread top surfaces 42, instead of being cylindrical are conical with respect to axes 31 and 33. Hence, the sides 44 and 46 which are respectively toward and away from such point of intersection will not be identical as are the sides in the case of a parallel axes structure, but nevertheless, will be concave to provide a flat thread bottom 48 mating sufficiently closely with the cooperating top 42 but having rounded bottom corners 47, the crest corner 43 being sharp as before to cooperate with at least one side of a cooperating thread to provide substantial fluid sealing. Such conical screw member configuration is especially useful where wear is a factor, since adjustment to take up wear is readily accomplished by moving the conical screws toward their smaller ends.

In this case, however, the angle of intersection, $\alpha$, of the axes of the screws must be considered so that the coordinates R and Y must be expressed by a somewhat different but similarly derived formula of more complicated nature. Figs. 11 and 12 illustrate a basis for such derivation which is also common both to parallel and intersecting coplanar axis screws for derivation of their tooth form.

The formulae then reads as follows:

$$Y = -(m+l)(1-\cos \alpha) - \frac{L}{2\pi}\delta + \frac{D}{2} \cos \beta \sin \alpha$$

$$R = \sqrt{h^2 + g^2}$$

where:
$\alpha$ = angle between axes
$(m+l)$ = distance along axis from intersection to R axis
$D$ = outside screw diameter at distance $(m+l)$
$\beta$ = independent variable angle traveled by point S since:

$$h = \frac{D}{2} \sin \beta$$

$$g = (m+l) \sin \alpha - \frac{D}{2} \cos \beta \cos \alpha$$

$$\delta = \beta + \arctan \frac{h}{g}$$

$$m = \frac{P}{\sin \alpha}$$

These equations can be simplified by making $\alpha=0$ to give the expression for the parallel axis structure.

The intermeshing screws have a thread form as derived above may be used in either parallel or intersecting axis screw pumps or presses in ways well known to the art. However, due to the more nearly exact meshing of the threads, such pumps or presses have a reduced back leakage path.

Various modifications of the invention, within the spirit thereof and the scope of the appended claim, will be apparent to those skilled in the art.

I claim:

Apparatus of the class described comprising a housing having an inlet and an outlet and a body portion therebetween, a plurality of intermeshing screw-threaded members mounted in the body portion of said housing for rotation in the same direction about coplanar axes, said members each having threads with lead of the same hand extending for at least one turn through said body portion closely adjacent thereto, said threads each having at least one concavely curved side maintained closely adjacent to the crest corner of a cooperating thread effective to provide substantial fluid sealing between said side and said corner, the form of the sides of said threads being defined by the formulae:

$$Y = -(m+l)(1-\cos \alpha) - \frac{L}{2\pi}\delta + \frac{D}{2} \cos \beta \sin \alpha$$

$$R = \sqrt{h^2 + g^2}$$

where:
$\alpha$ = angle between axes
$(m+l)$ = distance along axis from intersection to R axis
$D$ = outside screw diameter at distance $(m+l)$
$\beta$ = independent variable angle traveled by point S since:

$$h = \frac{D}{2} \sin \beta$$

$$g = (m+l) \sin \alpha - \frac{D}{2} \cos \beta \cos \alpha$$

$$\delta = \beta + \arctan \frac{h}{g}$$

$$m = \frac{P}{\sin \alpha}$$

References Cited in the file of this patent

UNITED STATES PATENTS

| | | |
|---|---|---|
| 1,698,802 | Mantelius | Jan. 15, 1929 |
| 2,048,286 | Pease | July 21, 1936 |
| 2,511,878 | Rathman | June 20, 1950 |

FOREIGN PATENTS

| | | |
|---|---|---|
| 246,507 | Switzerland | Oct. 1, 1947 |
| 310,625 | Italy | Aug. 28, 1933 |
| 347,246 | Great Britain | Apr. 20, 1931 |
| 413,887 | Germany | May 18, 1925 |
| 455,967 | Germany | Feb. 15, 1928 |
| 670,396 | Great Britain | Apr. 16, 1952 |
| 716,910 | Great Britain | Oct. 20, 1954 |
| 789,211 | France | Oct. 25, 1935 |